Figure 1:
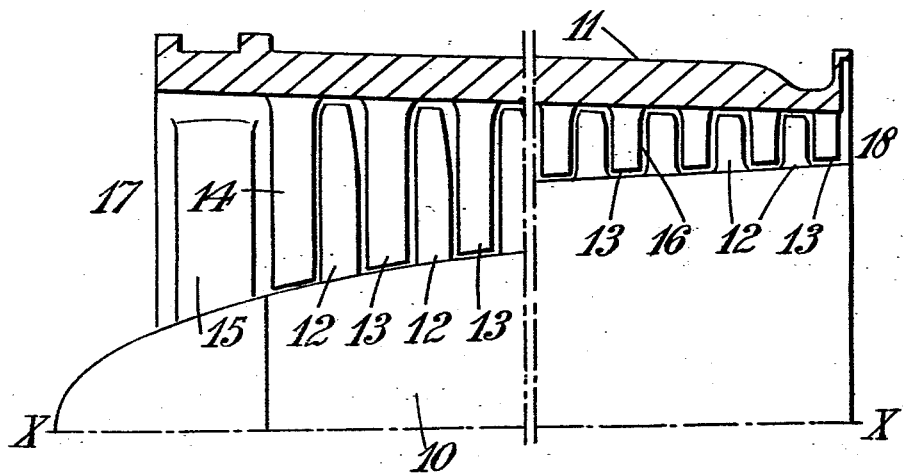

June 25, 1957   A. C. LOVESEY   2,797,044
MEANS FOR REGULATING THE CHARACTERISTICS OF
MULTI-STAGE AXIAL-FLOW COMPRESSORS
Original Filed June 15, 1950

United States Patent Office 2,797,044
Patented June 25, 1957

2,797,044
MEANS FOR REGULATING THE CHARACTERISTICS OF MULTI-STAGE AXIAL-FLOW COMPRESSORS

Alfred Cyril Lovesey, Littleover, England, assignor to Rolls-Royce Limited, Derby, England, a British company Original application June 15, 1950, Serial No. 168,253, now Patent No. 2,689,680, dated September 21, 1954. Divided and this application May 10, 1954, Serial No. 428,647

Claims priority, application Great Britain June 16, 1949

2 Claims. (Cl. 230—114)

This application is divided out of co-pending application Serial No. 168,253 filed June 15, 1950, now Patent No. 2,689,680.

This invention relates to multi-stage axial-flow compressors which comprise two relatively rotating bodies, hereinafter referred to as a stator and a rotor. One only of said bodies may rotate or alternatively both may rotate in opposite directions. The invention has for its object to provide a means of regulating the characteristics of the compressor in a desirable manner over a wide range of operating conditions.

The invention has special importance in relation to multi-stage axial-flow compressors of the high compression ratio kind, such as are, for example, used in gas-turbine engines for aircraft, where it is desired to design the compressor to operate at high efficiency, particularly in the upper portion of the speed range, corresponding to medium or cruise power and maximum power conditions.

It is usual to design such a compressor to obtain efficient operation at a particular speed, or at a particular value of a condition, such as compression ratio, which is dependent upon speed, and such design involves the matching of the blade characteristics, including incidence and profile, to maintain a desired flow condition within the compressor, at such particular speed or condition.

For example, the compressor may be designed so as to maintain a constant mean axial velocity of the working medium from the inlet to the outlet of the compressor at a particular rotational speed of the compressor rotor, at a particular compression ratio, or at a particular corrected rotational speed of the compressor rotor. In order to give such conditions, the shape of the compressor-duct, i. e. the annular passage from the inlet to the outlet of the compressor, and the incidence and shape of the blading are chosen appropriately, which results in the compressor-duct converging as from inlet to outlet, the reduction in cross-sectional area of the duct of the compressor compensating for the increasing density of the working medium as it passes through the stages.

The annular duct will usually converge continuously from inlet to outlet but it may have a parallel sided portion, or even a slightly divergent portion, the actual design being such as to give a desired, usually a constant, axial velocity of flow at each cross-section of the passage at a certain design condition.

As previously mentioned, it is usual to choose a cruise or maximum power condition of running as the design condition for efficient operation; at speeds below that corresponding to the design condition, when the pressure rise per stage is less than the designed pressure rise, there will tend to be an accelerating axial flow of the working medium from inlet to outlet of the compressor-duct due to the overall density ratio being reduced compared with that at the particular design condition. This acceleration appears as a reduction of the axial velocity of the working medium at inlet and an increase of axial velocity at outlet compared with those at the particular design condition.

The blade incidence and shape, being appropriately matched to maintain efficient operation of the compressor at the design speed, are incorrectly matched to maintain such operation at lower speeds, and further, particularly where the compressor is designed to operate at a high compression ratio, e. g. at 5 to 1, very serious difficulties are encountered in maintaining running at relatively slow speeds. Such difficulties, which are well known in the art, are attributable to the stalling of blades in the inlet stages of the compressor, due to the reduced axial velocity component of the working medium, which stalling may result in a complete breakdown of flow conditions in the compressor-duct.

Hitherto, it has been proposed that such difficulties should be overcome by the provision of means for adjusting the angular position of the stator-blades or of the rotor-blades, or of both, particularly in the inlet stages, for the purpose of varying the rotational swirl of the working medium in these stages appropriately to avoid the stalling characteristic mentioned.

Another proposal has been that valve means should be provided for bleeding off a quantity of the working medium at a stage intermediate between the inlet and outlet of the compressor. This arrangement provides for the maintenance of the axial velocity of the working medium in the low pressure stages of the compressor at a value approximately equal to that for the design condition without increasing axial velocity in the latter stages. The system, whilst providing certain desirable characteristics, clearly results in undesirable losses, and further involves installation and control problems.

It will be appreciated that the problems outlined above are aggravated when the compressor is designed for high compression ratios, as the convergence of the compressor-duct then becomes particularly marked; also in the use of high performance multi-stage axial-flow compressors in aircraft gas-turbine engines, the problem is further aggravated by the desirability of obtaining efficient operation in a very wide range of rotational speed and of altitude or intake pressure.

The main object of the present invention is to provide a novel construction of multi-stage axial-flow compressors in which the problems outlined above may be mitigated by adjusting, on change of rotor speed, the ratio, at the inlet of the compressor, of swirl velocity to axial velocity of the working fluid to a greater extent adjacent the inner wall of the compressor-duct than the extent if any to which it is adjusted adjacent the outer wall of the compressor-duct.

Figure 2:
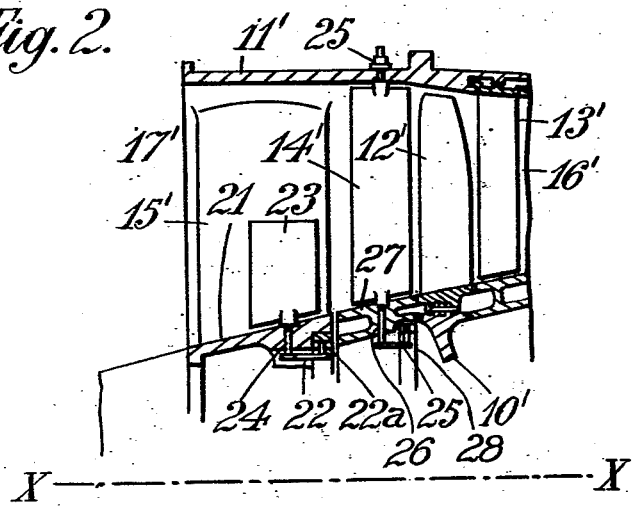

The invention may be more readily understood from the following description in which reference is made to the accompanying drawings, of which:

Figure 1 is a sectional elevation of a compressor of the kind with which the present invention is concerned, and Figure 2 shows a portion at the inlet of a compressor which embodies the invention.

Referring to Figure 1, the reference numeral 10 indicates the rotor-drum of the compressor which is mounted for rotation about the axis X—X and, together with the stator-casing 11, provides the walls of the compressor-duct 16. The compressor is a multi-stage compressor, each stage comprising a row of rotor-blades 12, mounted on the rotor-drum 10 for rotation therewith, and a row of stator-blades 13 mounted on the casing 11. The compressor is also provided with a row of fixed guide-vanes 14 mounted in the inlet 17 of the compressor-duct 16 upstream of the first row of rotor-blades 12.

The rotor-drum 10 is mounted on a shaft (not shown) which, at the inlet end of the compressor is mounted in a bearing (not shown) carried by support webs 15 which extend across the inlet 17 of the compressor-duct 16 from the stator-casing 11.

The compressor is designed to give a compression ratio of 5 to 1 at a selected rotational speed, and the compressor-duct 16 is dimensioned to give a constant axial velocity of the working fluid from the inlet 17 to the outlet 18 at the selected rotational speed. As a result, the cross-sectional area of the compressor-duct 16 is greater at the inlet 17 than it is at the outlet 18, i. e. the compressor-duct converges as from inlet to outlet.

Since the incidence and shape of the rotor-blades 12 and stator-blades 13 are appropriately matched to give efficient operation at the selected rotational speed, they are inappropriately matched for operation at other speeds; and serious difficulties are encountered in maintaining steady operation of the compressor at rotational speeds which are low compared with the selected speed. Such difficulties, which are well known in the art, are attributable, at least in part, to the reduced axial velocity of the working fluid through the inlet stages of the compressor, which is liable to the result in stalling of the compressor-blades in these stages, which in turn may result in a complete breakdown of flow conditions in the compressor-duct.

In constructions of multi-stage axial-flow compressors according to the present invention, these well known drawbacks are mitigated by increasing, when stalling is likely to occur, the ratio of swirl velocity to axial velocity of the working fluid passing through an inlet row of stator-blades (i. e. a row of stator-blades upstream of a row of rotor-blades which is liable otherwise to stall when the rotational speed is low) to a greater extent adjacent the inner wall of the compressor-duct than the extent of the increase, if any, in such ratio adjacent the outer wall of the compressor-duct.

By doing this, two results are achieved. Firstly the axial velocity of the working fluid adjacent the outer duct wall is increased, as compared with a similar construction in which the invention is not employed operating at the same speed, so that the flow conditions adjacent the outer duct wall approach the design conditions more closely and the likelihood of stalling adjacent the outer duct wall is reduced. Secondly the direction of motion of the working fluid relative to the succeeding row of rotor-blades is adjusted adjacent the inner duct wall to provide adequate compensation for the reduction in axial velocity of the working fluid, and so reduce the likelihood of stalling adjacent the inner duct wall as well.

One embodiment of the invention is shown in Figure 2. In this figure those parts of the compressor which correspond to the parts shown in Figure 1 are indicated by the same reference numerals with prime marks added. In this embodiment a row of adjustable stator-blades is provided upstream of the inlet guide-vanes 14'. Each blade 23 of this row is rotatable by its trunnion 24 which lies at an axis substantially radial to the axis of rotation X—X and extends through a stationary portion 21 of the inner wall of the compressor-duct 16' at its inlet 17'.

The blades 23 extend part-way only towards the outer duct wall 11' so that they lie within the area of an annulus co-axial with and within the compressor-duct and so that there is a space of considerable radial extent between the tips of the blades 23 and the casing 11'. In the construction shown the blades extend about half-way from the inner duct wall formed by ring 21 towards the casing 11'. Thus, when the blades 23 are rotated by their trunnions 24 to increase their outlet angles relative to the axial direction, the ratio of swirl velocity to axial velocity of air passing them will be increased adjacent the inner duct wall, but will be substantially unaffected adjacent the outer duct wall. However, the axial velocity will be increased adjacent the outer duct wall, for a given mass flow, due to the decreased axial velocity of the air in the inner annular portion of the duct.

Preferably the blades 23 are interconnected for simultaneous adjustment. Thus, as shown in Figure 2, the trunnions 24 may be provided with crank arms 22 which engage with a ring 22a, so that on rotation of the ring 22a about axis X—X, all the blades 23 are simultaneously adjusted.

In the embodiment shown in Figure 2, the inlet guide-vanes 14' which extend the whole way from the inner duct wall to the outer duct wall, are also adjustable in known manner each about a radial axis 25 and are interconnected for simultaneous adjustment. Thus for instance each blade 14' may be provided at its inner end with a spindle 26 journalled in the stator part 27. The spindles 26 carry at their inner ends operating radius arms 25 the free ends of which are engaged in a ring 28 coaxial with and rotatable about the axis of the compressor. On rotation of the ring 28 the radius arms 25 are moved through equal angles and the blades 14' are adjusted simultaneously and through equal angles.

I claim:

1. A multi-stage axial-flow compressor having an inner duct wall and an outer duct wall defining an annular compressor-duct between them, and an inlet row of stator-blades each of which extends radially outward from said inner duct wall part-way only across said compressor-duct and has a relatively large space between its tip and the outer duct wall and each of which is mounted within the compressor to be adjustable by rotation about an axis substantially radial to the axis of the compressor, and means to rotate the adjustable stator blades about their axes of rotation.

2. A multi-stage axial-flow compressor having an inner duct wall and an outer duct wall defining an annular compressor-duct between them, and an inlet row of stator-blades each of which blades extends radially outward from said inner duct wall to an extent no more than half-way across said compressor-duct towards the outer duct wall, and each of which is mounted within the compressor to be adjustable by rotation about an axis substantially radial to the axis of the compressor, and means to rotate the adjustable stator blades about their axes of rotation.

References Cited in the file of this patent

UNITED STATES PATENTS

| | | |
|---|---|---|
| 2,139,416 | McLane | Dec. 6, 1938 |
| 2,337,861 | Adamtchik | Dec. 28, 1943 |
| 2,424,839 | Morton | July 29, 1947 |
| 2,455,251 | Hersey | Nov. 30, 1948 |
| 2,460,778 | Willgoos | Feb. 1, 1949 |
| 2,606,713 | Bauger | Aug. 13, 1952 |
| 2,689,680 | Lovesey | Sept. 21, 1954 |

FOREIGN PATENTS

| | | |
|---|---|---|
| 630,747 | Great Britain | Oct. 20, 1949 |